(12) United States Patent
Kang et al.

(10) Patent No.: US 9,983,380 B2
(45) Date of Patent: May 29, 2018

(54) CAMERA MODULE AND METHOD FOR AUTO FOCUSING THEREOF

(71) Applicant: LG ELECTRONICS INC., Seoul (KR)

(72) Inventors: Hyungjoo Kang, Seoul (KR); Sungdu Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/353,386

(22) Filed: Nov. 16, 2016

(65) Prior Publication Data

US 2017/0059810 A1 Mar. 2, 2017

Related U.S. Application Data

(63) Continuation of application No. 14/601,850, filed on Jan. 21, 2015, now Pat. No. 9,516,212.

(30) Foreign Application Priority Data

Jan. 22, 2014 (KR) .................. 10-2014-0007783
Feb. 19, 2014 (KR) .................. 10-2014-0018974

(51) Int. Cl.
| | |
|---|---|
| *G02B 7/08* | (2006.01) |
| *H04N 5/232* | (2006.01) |
| *H04N 5/225* | (2006.01) |
| *G03B 3/10* | (2006.01) |
| *H02K 1/17* | (2006.01) |

(Continued)

(52) U.S. Cl.
CPC ................ *G02B 7/08* (2013.01); *G03B 3/10* (2013.01); *H02K 1/17* (2013.01); *H02K 1/34* (2013.01); *H02K 41/0354* (2013.01); *H04N 5/2254* (2013.01); *H04N 5/2257* (2013.01); *H04N 5/23212* (2013.01); *G03B 2205/0069* (2013.01)

(58) Field of Classification Search
CPC ........ G02B 7/08; H02K 1/17; H02K 41/0354; H04N 5/23212
See application file for complete search history.

(56) References Cited

U.S. PATENT DOCUMENTS

| | | | |
|---|---|---|---|
| 6,154,611 | A | 11/2000 | Washisu |
| 7,620,305 | B2 | 11/2009 | Noji |
| 7,684,685 | B2 | 3/2010 | Takahashi |

(Continued)

FOREIGN PATENT DOCUMENTS

| | | |
|---|---|---|
| CN | 101236285 A | 8/2008 |
| JP | 59-231745 A | 12/1984 |

(Continued)

*Primary Examiner* — Amy Hsu
(74) *Attorney, Agent, or Firm* — Birch, Stewart, Kolasch & Birch, LLP

(57) ABSTRACT

A camera module including a fixing unit including a hole formed therein; a moving unit including at least one lens, and configured to linearly move in the hole of the fixing unit; and a driving unit configured to drive the moving unit. Further, the driving unit includes a corresponding magnet arranged in the inner surface of the hole of the fixing unit; a moving coil surrounding the outer surface of the moving unit; and a fixed coil arranged in the fixing unit and configured to receive from the moving coil a current or voltage variable based on a distance with the moving coil.

27 Claims, 23 Drawing Sheets

(51) Int. Cl.
*H02K 1/34* (2006.01)
*H02K 41/035* (2006.01)

(56) References Cited

U.S. PATENT DOCUMENTS

| | | | |
|---|---|---|---|
| 7,925,148 | B2 | 4/2011 | Choi et al. |
| 8,190,014 | B2 | 5/2012 | Tsuda et al. |
| 8,531,534 | B2 | 9/2013 | Hu et al. |
| 8,577,213 | B2 * | 11/2013 | Shiraki .............. G02B 7/023 396/52 |
| 8,743,218 | B2 | 6/2014 | Tsuchida |
| 8,896,749 | B2 | 11/2014 | Kudo |
| 9,134,503 | B2 | 9/2015 | Topliss |
| 9,423,631 | B2 | 8/2016 | Cho et al. |
| 2003/0081137 | A1 | 5/2003 | Yamazaki |
| 2004/0174614 | A1 | 9/2004 | Hovanky |
| 2005/0253951 | A1 * | 11/2005 | Fujimoto ............ H04N 5/2253 348/335 |
| 2005/0265705 | A1 | 12/2005 | Uenaka |
| 2007/0159010 | A1 | 7/2007 | Su et al. |
| 2007/0285522 | A1 | 12/2007 | Kimura |
| 2008/0297922 | A1 * | 12/2008 | Lule .................. G02B 7/08 359/824 |
| 2009/0003818 | A1 | 1/2009 | Park et al. |
| 2009/0022487 | A1 | 1/2009 | Weng et al. |
| 2010/0033616 | A1 | 2/2010 | Huang et al. |
| 2010/0060774 | A1 | 3/2010 | Azuma et al. |
| 2010/0142937 | A1 | 6/2010 | Chen et al. |
| 2011/0122268 | A1 | 5/2011 | Okamoto et al. |
| 2011/0261248 | A1 | 10/2011 | Matsuda |
| 2011/0286099 | A1 | 11/2011 | Shiraki et al. |
| 2012/0081559 | A1 | 4/2012 | Sato |
| 2012/0092768 | A1 | 4/2012 | Shiraki et al. |
| 2012/0120492 | A1 * | 5/2012 | Sato ................ G02B 27/646 359/557 |
| 2013/0215511 | A1 | 8/2013 | Wu et al. |
| 2013/0215525 | A1 | 8/2013 | Wang et al. |
| 2014/0009631 | A1 | 1/2014 | Topliss |
| 2014/0098421 | A1 * | 4/2014 | Umezu .............. G02B 7/102 359/554 |
| 2014/0118601 | A1 | 5/2014 | Myung |
| 2015/0207983 | A1 | 7/2015 | Kang et al. |
| 2015/0365568 | A1 | 12/2015 | Topliss et al. |

FOREIGN PATENT DOCUMENTS

| | | |
|---|---|---|
| JP | 60-49309 A | 3/1985 |
| JP | 1-206861 A | 8/1989 |
| JP | 5-196983 A | 8/1993 |
| JP | 9-33792 A | 2/1997 |
| JP | 2000-295831 A | 10/2000 |
| JP | 2004-271693 A | 9/2004 |
| JP | 2009-271204 A | 11/2009 |
| JP | 2010-164638 A | 7/2010 |
| JP | 2010-204429 A | 9/2010 |
| JP | 2011-22562 A | 2/2011 |
| JP | 2012-88477 A | 5/2012 |
| JP | 2012-128390 A | 7/2012 |
| JP | 2012-177754 A | 9/2012 |
| KR | 10-2006-0088155 A | 8/2006 |
| KR | 10-2008-0006722 A | 1/2008 |
| KR | 10-2008-0036127 A | 4/2008 |
| KR | 10-2010-0039925 A | 4/2010 |
| KR | 10-2012-0117236 A | 10/2012 |
| KR | 1020130029631 | 3/2013 |
| KR | 1020130071000 | 6/2013 |
| KR | 10-2015-0080710 A | 7/2015 |
| KR | 10-2015-0097998 A | 8/2015 |
| KR | 10-2016-0020692 A | 2/2016 |
| WO | WO 2015/111884 A1 | 7/2015 |

* cited by examiner

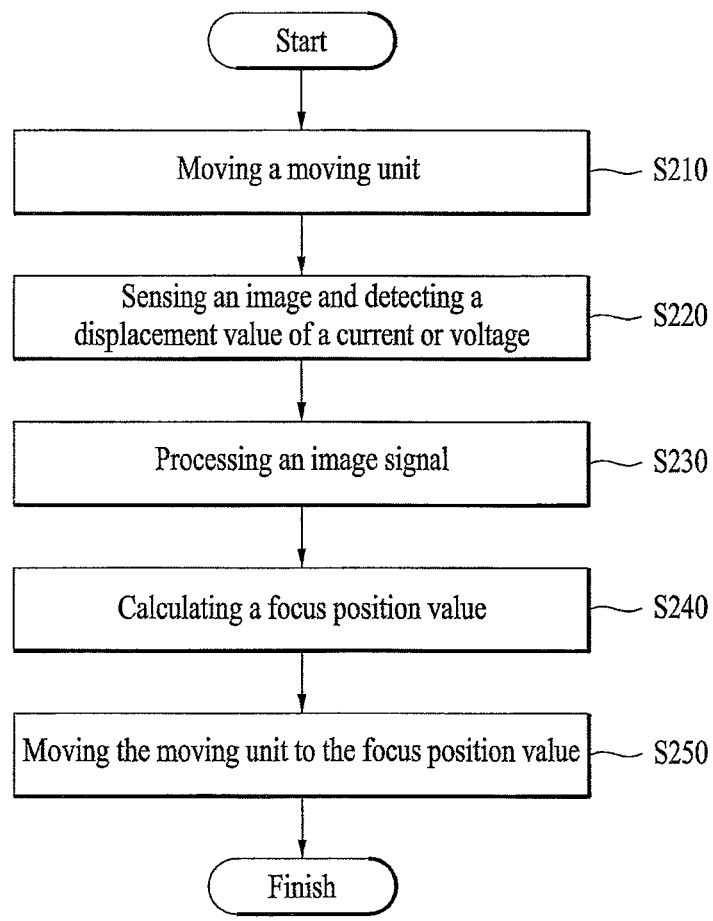

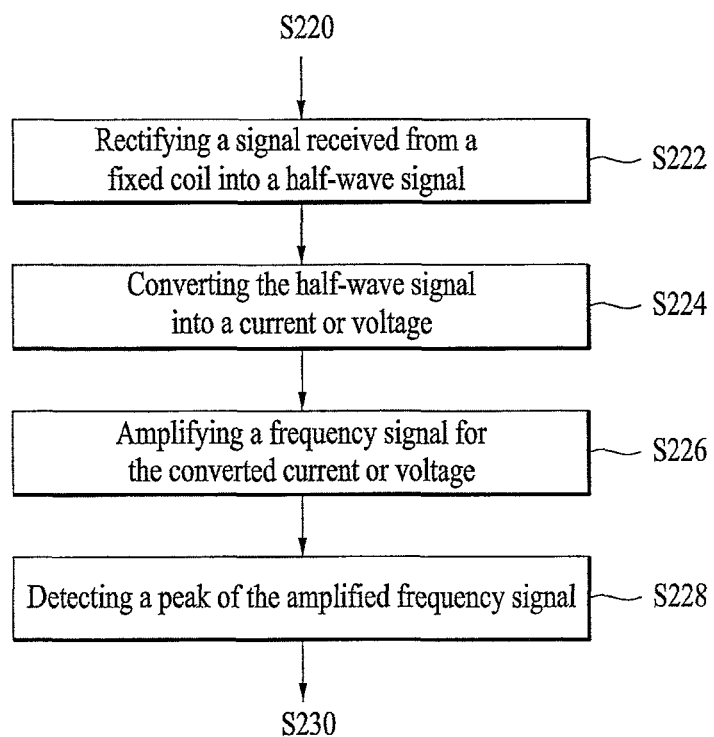

CAMERA MODULE AND METHOD FOR AUTO FOCUSING THEREOF

CROSS-REFERENCE TO RELATED APPLICATIONS

This application is a Continuation of copending application Ser. No. 14/601,850, filed on Jan. 21, 2015, which claims priority under 35 U.S.C. §119(a), to Korean Patent Applications Nos. 10-2014-0007783, filed on Jan. 22, 2014 and 10-2014-0018974, filed on Feb. 19, 2014, the contents of which are hereby incorporated by reference herein in their entirety.

BACKGROUND OF THE INVENTION

Field of the Invention

Embodiments of the present invention relate to a camera module having a voice coil motor actuator and a method for auto-focusing thereof.

Discussion of the Related Art

Mobile terminals include highly integrated diverse functions and tend to be light in weight and have a small size. In addition, camera modules mounted in mobile terminals are downsizing including smaller lenses. Further, an optical system of a camera module requires an auto focus function to make an object clearly visible. Such an auto focus function needs various types of actuators to move a lens module to an optimal focal point. The auto focus of the camera module may also be varied in accordance with characteristics of the actuator for moving the lens module.

An auto focus actuator may include various types of actuators. Examples of various actuators include a voice coil motor (VCM) actuator, an actuator driven by a piezoelectric force and a MEMS actuator driven based on a capacitive method. In addition, the voice coil motor (VCM) actuator is configured of a magnetic circuit in which a permanent magnet is provided in a fixing unit of the camera module, with a coil attached to a lens module to drive, such that the voice coil motor actuator can drive the lens module, using Lorentz's force traveling through the coil.

Further, the voice coil motor actuator extracts a difference between magnetic flux values calculated from phase change of the lens module, using a sense attached to the lens module, only to calculate an optical value of auto focus for the lens module. In such voice coil motor actuator, three power supply sources have to be connected to the sensor to attach the sensor to the lens module. Accordingly, a manufacture process is complicated. In other words, at least five connectors have to be provided in the lens module of the voice coil motor actuator and the at least five connectors include two connectors for electrical connection with the coil located in the lens module and three connectors for electrical connection with the sensor located in the lens module. Accordingly, it is difficult to design and manufacture the voice coil motor actuator.

Moreover, in the voice coil motor actuator using the lens module having the sensor attached thereon, it takes quite a long time to move the lens module to an optimal position of auto focus. There may also be auto focus position errors in the lens module.

SUMMARY OF THE INVENTION

Accordingly, one object of the present invention is to solve the disadvantages mentioned above and other problems.

Another object of the present invention is to provide a camera module having a fixing unit in which a sensor is provided and a moving unit in which a flux distortion projection arranged to find an auto focus position rapidly and precisely, and an auto focus method thereof.

Another object of the present invention is to provide a camera module including a fixed coil arranged in a fixing unit and a moving coil arranged in a moving unit, which can find out an auto focus position rapidly and precisely based on a displacement value of a current or voltage in accordance with a distance between the fixed coil and the moving coil, and a method for auto focusing of the camera module.

A further object of the present invention is to provide a camera module including a damper arranged between a spring and a fixing unit to reduce proper vibration of the spring, and a method for auto focusing of the camera module.

To achieve these objects and other advantages and in accordance with the purpose of the invention, as embodied and broadly described herein, a camera module includes a fixing unit comprising a hole formed therein; a moving unit comprising at least one lens, the moving unit configured to linearly move in the hole of the fixing unit; and a driving unit for driving the moving unit, wherein the driving unit includes a magnet arranged in an inner surface of the hole formed in the fixing unit; a moving coil configured to surround an outer surface of the moving unit; and a fixed coil arranged in the fixing unit to receive from the moving coil a current or voltage variable based on a distance with the moving coil.

In another embodiment of the camera module, the driving unit may include a plurality of magnets arranged in an inner surface of the hole formed in the fixing unit; a sensor arranged in the inner surface of the hole formed in the fixing unit to sense change of flux caused by the movement of the moving unit; a coil for surrounding an outer surface of the moving unit; and a flux distortion projection projected from the outer surface of the moving unit to distort the flux caused by the movement of the moving unit.

Embodiments of the present invention also provide a method for auto focusing of a camera module comprising a moving unit comprising a flux distortion projection to distort flux flow and a lens arranged therein; and a fixing unit comprising a sensor arranged therein to sense change of the flux caused by the movement of the moving unit, the method for auto focusing of the camera module including sensing an image incident through a lens of the moving unit and change of flux caused by the movement of the moving unit; processing the sensed image signal; calculating an optimal focus position value based on the processed image signal and a variation value of the flux caused by the movement of the moving unit; and moving the moving unit to the calculated optimal focus position value.

Embodiments of the present invention also provide a method for auto focusing of a camera module comprising a moving unit comprising a moving coil and a lens arranged therein; and a fixing unit comprising a fixed coil arranged therein to receive from the moving coil a current or voltage variable based on a distance with the moving coil, the method for auto focusing of the camera module including applying a driving signal to the moving coil and moving the moving unit based on the driving signal; sensing an image incident through the lens of the moving unit and detecting a displacement value of a current or voltage based on a distance between the moving coil and the fixed coil in accordance with the movement of the moving unit; processing the sensed image signal; calculating an optimal focus position value based on the processed image signal and the detected displacement value of the current or voltage; and moving the moving unit to the calculated optimal focus position value.

BRIEF DESCRIPTION OF THE DRAWINGS

Arrangements and embodiments may be described in detail with reference to the following drawings in which like reference numerals refer to like elements and wherein:

FIGS. 19 and 20 are flow charts illustrating an auto focusing method of a camera module in accordance with the embodiment shown in FIG. 13.

DESCRIPTION OF EMBODIMENTS

Figure 1A:
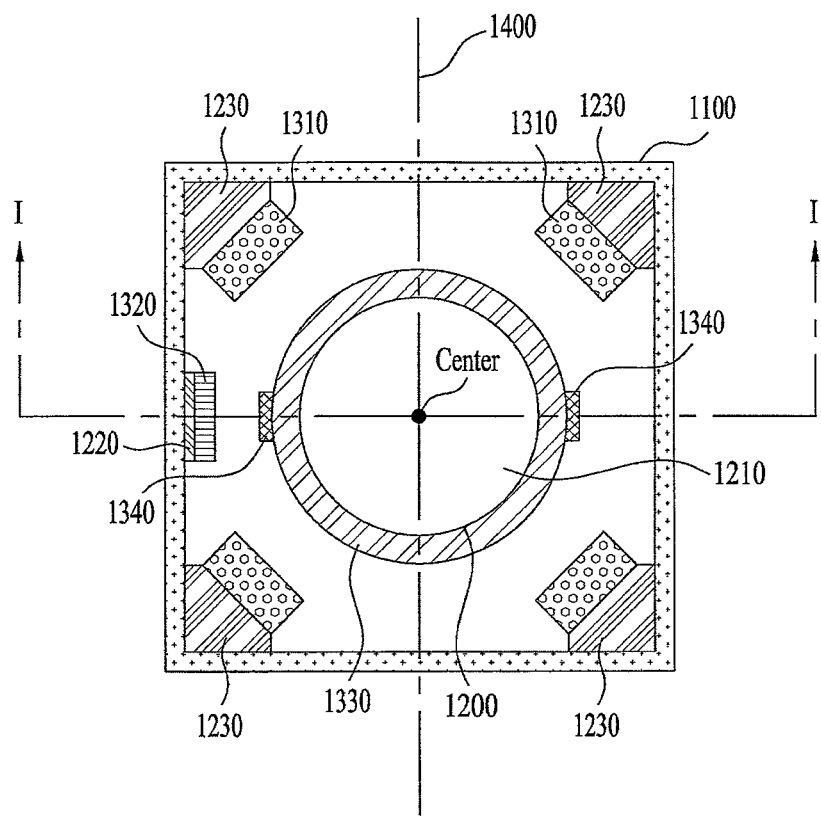
FIGS. 1A and 1B are diagrams illustrating a structure of a camera module in accordance with one embodiment of the present invention.

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present invention.

When an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items. In addition, "at least one of X, Y, and Z" can be construed as X only, Y only, Z only, or any combination of two or more items X, Y, and Z (e.g., XYZ, XYY, YZ, ZZ).

The terminology used herein is for the purpose of describing embodiments only and is not intended to be limiting of the disclosed subject matter. As used herein, the singular forms "a", "an", and "the" are intended to include the plural forms as well, unless the context clearly indicates otherwise. In addition, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
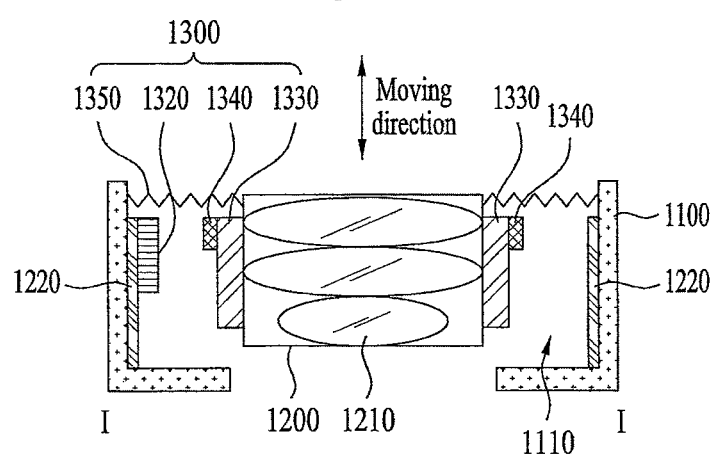

FIGS. 1A and 1B are diagrams illustrating a structure of a camera module in accordance with one embodiment of the present invention. In particular, FIG. 1A is a plane view and FIG. 1B is a sectional diagram along I-I line. As shown, the camera module includes a fixing unit 1100, a moving unit 1200 and a driving unit 1300.

In addition, a hole 1110 may be formed in a central region of the fixing unit 1100. The moving unit 1200 includes at least one lens 1210 and linearly moves in the hole 1110 of the fixing unit 1100. The moving unit 1200 may be a lens module having lenses 1210. Further, the driving unit 1300 can drive the moving unit 1200 to linearly move along upward and downward directions.

The driving unit 1300 may be an actuator for moving the moving unit 1200 and include a plurality of magnets 1310, a sensor 1320, a coil 1330 and a flux distortion projection 1340. In addition, the plurality of magnets 1310 may be arranged in an inner surface of the hole 1110 formed in the fixing unit 1100. For example, the plurality of the magnets 1310 may be arranged at uniform intervals. The plurality of magnets 1310 may also be arranged at different intervals.

The plurality of magnets 1310 may be arranged in symmetry with respect to a coordinate axis 1400 passing a center of the hole 1110 formed in the fixing unit 1100. The reason why the plurality of the magnets 1310 are arranged in symmetry with respect to the coordinate axis 1400 passing the center of the hole 1110 formed in the fixing unit 1100 is that change of flux caused by the movement of the moving unit 1200 which is the lens module can be sensed stably, without external influence.

Alternatively, neighboring magnets 1310 are spaced apart a first distance from each other and the magnets 1310 may be spaced apart a second distance from the coil 1330. The first distance may be farther than the second distance. The plurality of the magnets 1310 may be supported by a magnet supporter 1230 projected from the inner surface of the hole 1110, respectively.

The sensor 1320 may be arranged in the inner surface of the hole 1110 formed in the fixing unit 1100 and sense change of flux in accordance with the movement of the moving unit 1200. The sensor 1320 may be arranged between neighboring magnets 1310. In addition, the sensor 1320 may be at least one of a hall sensor and a search coil sensor.

The sensor 1320 may be supported by a sensor supporter 1220 projected from the inner surface of the hole 1110. The sensor supporter 1220 may be arranged in symmetry with respect to a coordinate axis 1400 passing a center of the hole 1110 formed in the fixing unit 1100. Change of flux in accordance with the movement of the moving unit 1200 can be sensed stably, without external influence.

Next, the coil 1330 may be arranged to surround an outer surface of the moving unit 1200 and move together with the moving unit 1200. The flux distortion projection 1340 may be projected from the outer surface of the moving unit 1200 to distort flux flow in accordance with the movement of the moving unit 1200.

In addition, the flux distortion projection 1340 may be arranged to face the sensor 1320. The flux distortion projection 1340 and the sensor 1320 may be spaced apart a predetermined distance from each other. For example, the distance between the flux distortion projection 1340 and the sensor 1320 may be approximately 0.05-0.5 mm.

The flux distortion projection 1340 may be arranged in an edge portion of the moving unit 1200 and the embodiment of the present invention is not limited thereto. Further, the flux distortion projection 1340 may be arranged on the coil 1330. In addition, the flux distortion projection 1340 may be arranged in symmetry with respect to the coordinate axis 1400 passing the center of the hole 1110 formed in the fixing unit 1100.

The reason why the flux distortion projection 1340 is arranged in symmetry with respect to the coordinate axis 1400 passing the center of the hole 1110 of the fixing unit 1100 is that change of flux in accordance with the movement of the moving unit 1200 as the lens module can be sensed stably, without external influence. The driving unit 1300 may include a spring 1350 connected between the fixing unit 1100 and the moving unit 1200 to provide an elastic force when the moving unit 1200 is moving.

A damper may be arranged between the spring 1350 and the fixing unit 1100. The damper may be arranged adjacent to a connection spot between the spring 1350 and the fixing unit 1100. In addition, the reason why the damper is provided is that vibration of the spring 350 can be reduced. An error of auto focus can also be prevented by reducing hysteresis.

The camera module may further include an auto focusing control unit for controlling auto focusing of the moving unit which is the lens module. The auto focusing control unit may include an image sensor, an image signal processor, a focus position calculator and a driving controller.

The image sensor can sense an image incident through a lens 1210 of the moving unit 1200 and the image signal processor can process the image signal sensed by the image sensor. The focus position calculator may receive a variation of flux in accordance with the movement of the moving unit 1200 sensed by the sensor 1320 arranged in the fixing unit 110 and calculate an optimal focus position value.

The driving controller can control the driving unit to move the moving unit 1200 to the calculated optimal focus position value. The camera module in accordance with one embodiment of the present invention may have the sensor 1320 attached to the fixing unit 1100 and the flux distortion projection 1340 arranged in the moving unit 1200, such that the auto focus position can be found rapidly and precisely. In the embodiment of the present invention, the damper is arranged between the spring 1350 and the fixing unit 1100 and the proper vibration of the spring 1350 is reduced. Accordingly, errors of the auto focus may be prevented.

Figure 2A:
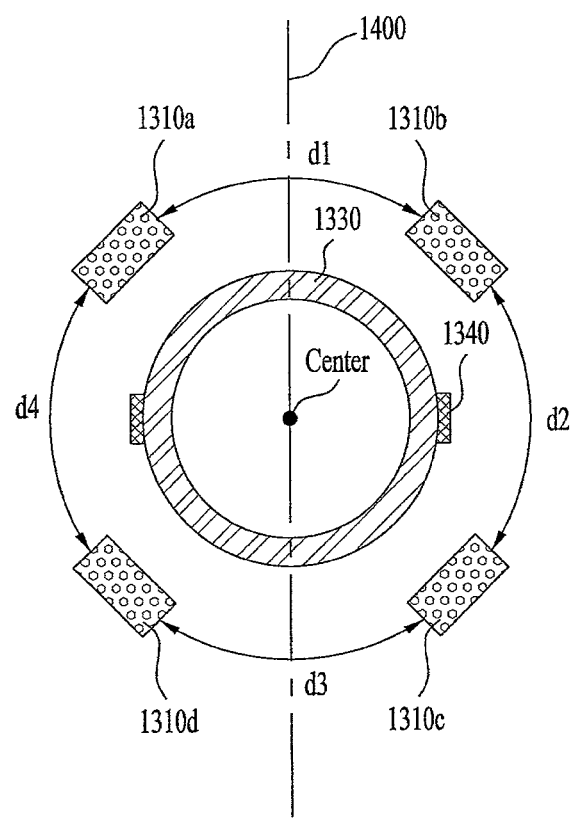
FIGS. 2A and 2B are plane view illustrating arrangement of a magnet shown in FIG. 1A.
Figure 2B:
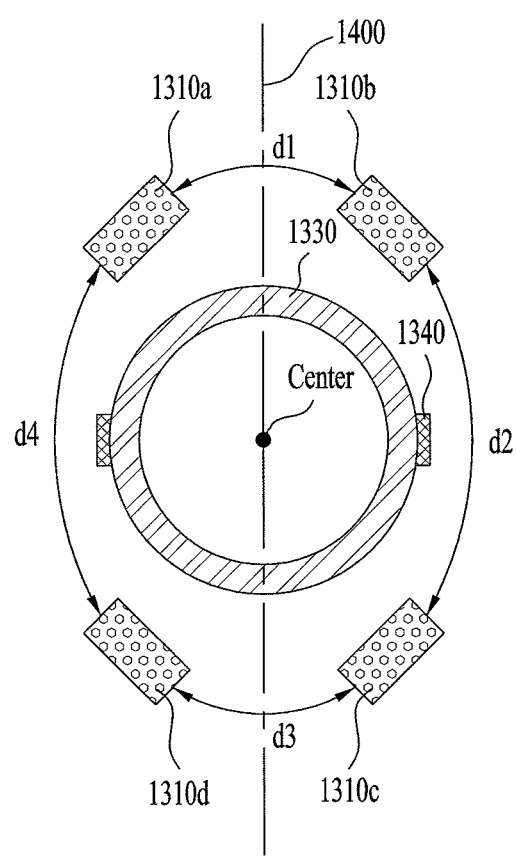

Next, FIGS. 2A and 2B are plane views illustrating an arrangement of a magnet shown in FIG. 1A. As shown in FIGS. 2A and 2B, the plurality of the magnets 1310 may be arranged in the inner surface of the hole formed in the fixing unit and they may be arranged to surround the coil 1330. In other words, a permanent magnet is arranged in the fixing unit and a moving coil is arranged in the moving unit, only to configure a magnetic circuit. In such a magnetic circuit, the moving unit which is the lens module is driven by the Lorenz's force flowing through the coil.

The plurality of the magnets 1310 may be spaced apart the same distance from each other and they may be arranged in symmetry with respect to the coordinate axis 1400 passing the center of the hole formed in the fixing unit. The reason why the plurality of the magnets 1310 are arranged in symmetry with respect to the coordinate axis is that the change of flux in accordance with the movement of the moving unit can be sensed stably, without external influence.

For example, when four of first, second, third and fourth magnets (1310a, 1310b, 1310c and 1310d) are arranged near the coil 1330, a distance (d1) between first and second magnets 1310a and 1310b, a distance (d2) between second and third magnets 1310b and 1310c, a distance (d3) between third and fourth magnets 1310c and 1310d and a distance (d4) between first and fourth magnets 1310a and 1310d may be equal to each other.

The plurality of the magnets 1310 may be arranged not to face the flux distortion projection 1340 projected from the coil 1330. That is because the sensor has to be arranged in the distance (d4) between the first and fourth magnets 1310a and 1310d, which is the region facing the flux distortion projection 1340. Further, the plurality of the magnets 1310 may be arranged in different intervals and they may be arranged in symmetry with respect to the coordinate axis 1400 passing the center of the hole formed in the fixing unit.

For example, when four of first, second, third and fourth magnets 1310a, 1310b, 1310c and 1310d are arranged near the coil 1330 as shown in FIG. 2B, a distance (d1) between first and second magnets 1310a and 1310b, a distance (d3) between third and fourth magnets 1310c and 1310d may be equal to each other and a distance (d2) between second and third magnets 1310b and 1310c and a distance (d4) between first and fourth magnets 1310a and 1310d may be equal to each other.

The distance (d1) between the first and second magnets 1310a and 1310b and the distance (d3) between the third and fourth magnets 1310c and 1310d may be smaller than the distance (d2) between the second and third magnets 1310b and 1310c and the distance (d4) between the first and fourth magnets 1310a and 1310d.

If the sensor arranged in the distance (d4) between the first and fourth magnets 1310a and 1310d is too close to the magnets 1310, the change of flux in accordance with the movement of the moving unit which is the lens module is minimal and it can be difficult to sense the change of the flux precisely.

Figure 3:
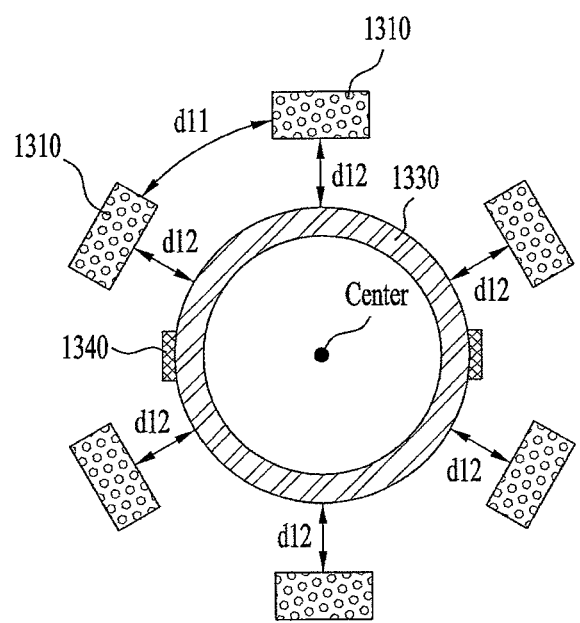
FIG. 3 is a plane view illustrating a distance between the magnet and a coil shown in FIG. 1A.

FIG. 3 is a plane view illustrating a distance between the magnet and a coil shown in FIG. 1A. As shown in FIG. 3, the plurality of the magnets 1310 may be arranged in the inner surface of the hole formed in the fixing unit and surround the coil 1330 arranged in the moving unit. The plurality of the magnets may be arranged in uniform intervals and they may be arranged in symmetry with respect to the coordinate axis passing the center of the hole formed in the fixing unit.

In addition, each two neighboring magnets 1310 may be spaced apart a first distance (d11) and the magnets and the coil may be spaced apart a second distance (d12). The first distance (dip may be farther than the second distance (d12). If the distance between the magnets 1310 and the coil 1330 is too far, the flux traveling through the coil 1330 is weak and the change of the flux is minimal when the moving unit which is the lens module is moving. Accordingly, it could be difficult to sense the change of the flux precisely.

Figure 4:
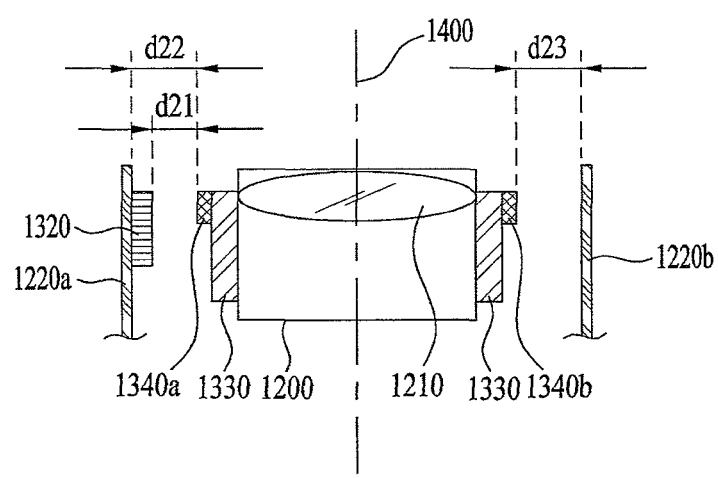
FIG. 4 is a sectional diagram illustrating a distance between the sensor shown in FIG. 1A and a flux distortion projection.

FIG. 4 is a sectional diagram illustrating a distance between the sensor shown in FIG. 1A and a flux distortion projection. As shown in FIG. 4, the sensor 1320 may be arranged in the inner surface of the hole formed in the fixing unit and sense the change of flux caused by movement of the moving unit 1200. The sensor 1320 may be at least one of a hall sensor, a magnetoresistive sensor and a search coil sensor.

The sensor 1320 may be supported by a sensor supporter 1220 and the sensor supporter 1220 may be arranged in symmetry with respect to the coordinate axis 1400 passing the center of the hole formed in the fixing unit. Accordingly, the sensor supporter 1200 may include a first sensor supporter 1220a arranged in a predetermined portion of the moving unit 1200 to support the sensor 1320 and a second sensor supporter 1220b arranged in the other opposite portion of the moving unit 1200.

The coil 1330 may be arranged to surround an outer surface of the moving unit 1200 and move together with the moving unit 1200. The flux distortion projection 1340 may be projected from the outer surface of the moving unit 1200 and distort flux flow in accordance with the movement of the moving unit 1200. The flux distortion projection 1340 may include a first flux distortion projection 1340a arranged in a predetermined portion of the moving unit 1200 to face the first sensor supporter 1220a and the sensor 1320, and a second flux distortion projection 1340b arranged in the other opposite portion of the moving unit 1200 to face the second sensor supporter 1220b.

In addition, the first flux distortion projection 1340a and the sensor 1320 may be spaced apart a distance (d21) from each other. For example, the distance (d21) between the first flux distortion projection 1340a and the sensor 1320 may be approximately 0.05 mm. The first flux distortion projection 1340a and the first sensor supporter 1220a may be spaced apart a distance (d22) from each other. The distance (d22) may be farther than the distance (d21) between the first distortion projection 1340a and the sensor 1320 by the thickness of the sensor 1320.

The distance (d22) between the first flux distortion projection 1340a and the first sensor supporter 1220a may be equal to a distance (d23) between the second flux distortion projection 1340b and the second sensor supporter 1220b. The reason why the sensor supporter 1220 and the flux distortion projection 1340 are arranged in symmetry is that flux change in accordance with the movement of the moving unit 1200 which is the lens module can be sensed stably, without external influence.

Figure 5A:
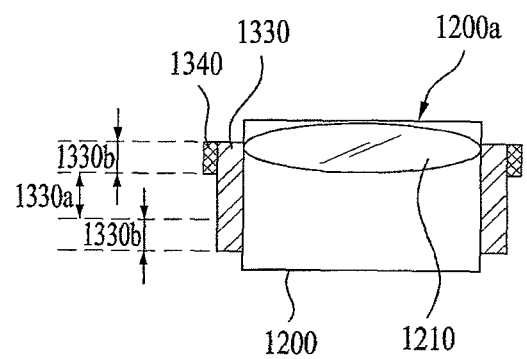
FIGS. 5A through 5C are sectional diagrams illustrating a position of the flux distortion projection shown in FIG. 1A.
Figure 5B:
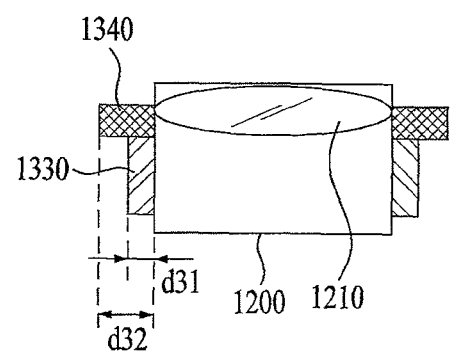
Figure 5C:
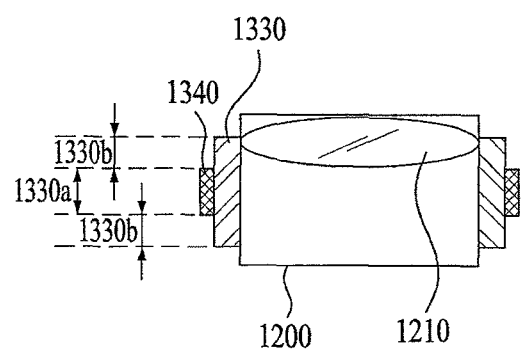

FIGS. 5A through 5C are sectional diagrams illustrating a position of the flux distortion projection shown in FIG. 1A. As shown in FIGS. 5A through 5C, the flux distortion projection 1340 may distort flux flow in accordance with the movement of the moving unit 1200. As shown in FIG. 5A, the flux distortion projection 1340 may be projected from the coil 1330 surrounding the outer surface of the moving unit 1200.

In addition, the flux distortion projection 1340 may be arranged adjacent to an upper surface 1200a of the moving unit 1200 having the lens 1210. For example, the coil 1330 may include a central portion 1330a, a first edge portion 1330b arranged in a portion next to the central portion 1330a, adjacent to the upper surface 1200a of the moving unit 1200, and a second edge portion 1330b arranged in the opposite portion next to central portion 1330a, adjacent to a lower surface of the moving unit 1200. The flux distortion projection 1340 may be projected from the first edge portion 1330b of the coil 1330.

Alternatively, as shown in FIG. 5B, the flux distortion projection 1340 may be projected from an outer surface of the moving unit 1200, adjacent to the upper surface 1200a of the moving unit 1200 having the lens 1210. The flux distortion projection 1340 may be in contact with a predetermined portion of the coil 1330 surrounding the outer surface of the moving unit 1200.

The height of the projected portion provided in the flux distortion projection 1340 may be larger than the height of the projected portion provided in the coil 1330. For example, a distance (d31) between a lateral surface 1200 and a projected upper surface of the coil 1330 may be smaller than a distance (d32) between a lateral surface of the moving unit 1200 and a projected upper surface of the flux distortion projection 1340.

A rate of the projected height of the flux distortion projection 1340 to the projected height of the coil 1330 is 1.1:~2:1. Alternatively, the flux distortion projection 1340 may be projected from the coil 1330 surrounding the outer surface of the moving unit 1200. The flux distortion projection 1330 may be arranged in a central portion of the coil 1330. For example, the coil 1330 may include a central portion 1330a, a first edge portion 1330b arranged next to the central portion 1330a, adjacent to a top surface 1200a of the moving unit 1200 and a second edge portion 1330b next to the other side of the central portion 1330a, adjacent to a lower surface of the moving unit 1200. The flux distortion projection 1340 may be projected from the central portion 1330a of the moving unit 1200.

Figure 6:
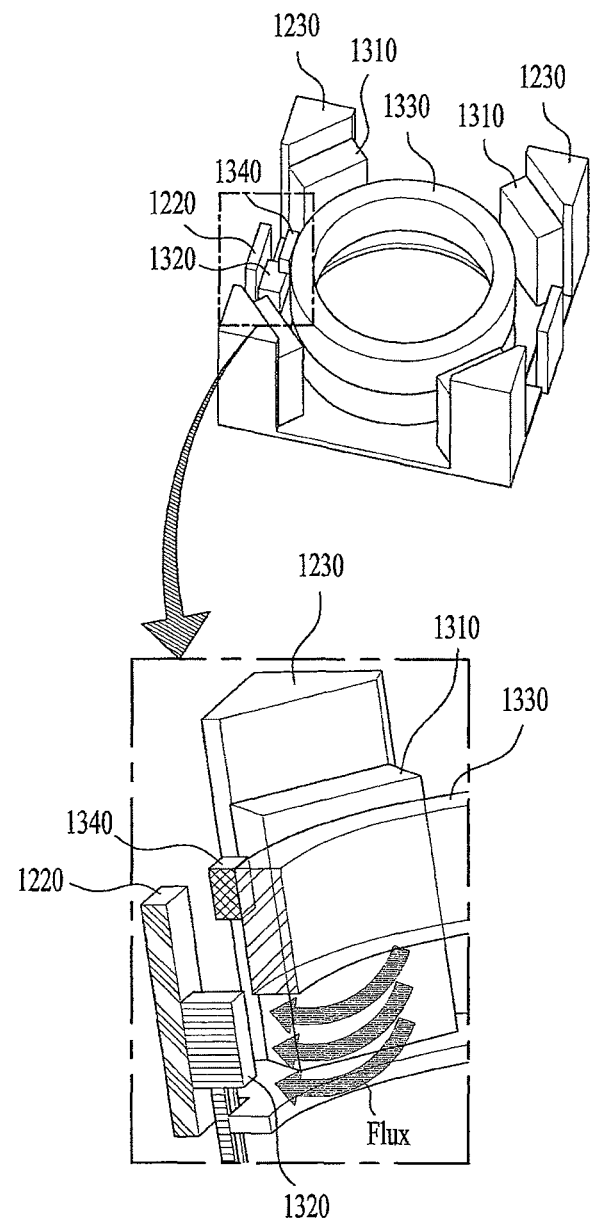
FIGS. 6 and 7 are diagrams illustrating flux travelling distortion generated by the flux distortion projected.
Figure 7:
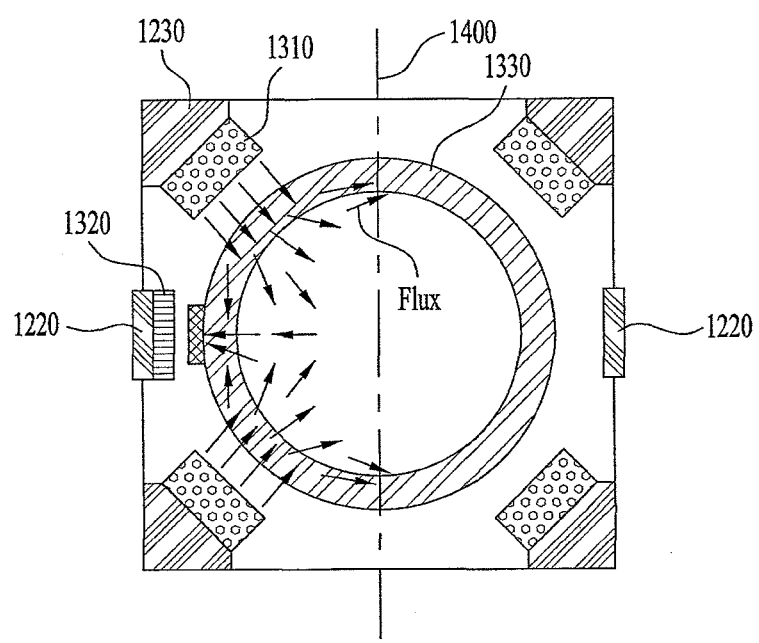

FIGS. 6 and 7 are diagrams illustrating flux flow distortion caused by the flux distortion projection. FIG. 6 is a perspective diagram and FIG. 7 is a plane view. As shown in FIGS. 6 and 7, the plurality of the magnets 1310 supported by the magnet supporter 1230 may be arranged to surround the coil 1330. The flux distortion projection 1340 may be moved upward or downward by the movement of the coil having the flux distortion projection 1340 projected there from.

Facing the flux distortion projection 1340, the sensor 1320 supported by the sensor supporter 1220 may be arranged to sense change of flux. As the coil 1330 is moved, flux flow may change. The flux flow is distorted by the flux distortion projection 1340 projected from the coil 130 and the flux flow is then changed a lot. Accordingly, the sensor 1320 may sense change of the flux flow and the moving position of the moving unit can be sensed precisely. In other words, the flux distortion projection 1340 is employed to amplify the change of the flux so as to figure out the moving position of the moving unit having the lens module.

Figure 8:
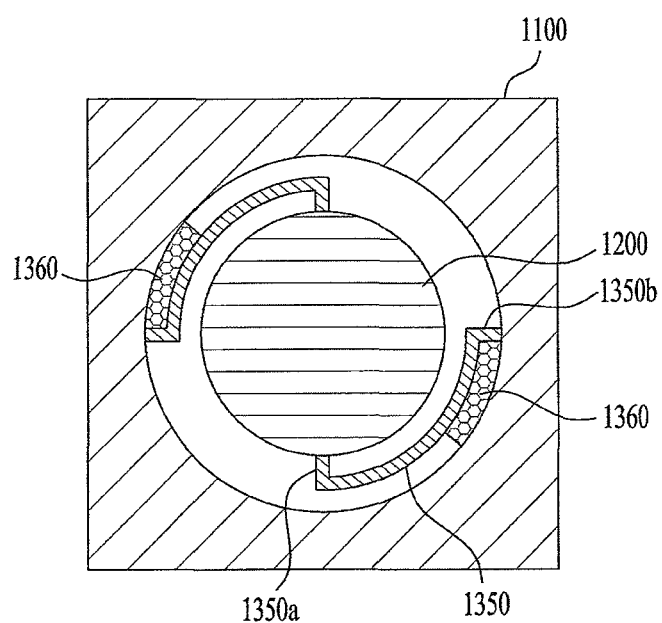
FIG. 8 is a plane view illustrating a spring shown in FIG. 1A.

FIG. 8 is a plane view illustrating a spring of FIG. 1A. As shown in FIG. 8, the spring 1350 is connected between the fixing unit 1100 and the moving unit 1200, to provide the elasticity as the moving unit 1200 is moved. The spring 1350 may include a first connected portion 1350a connected to the moving unit 1200 and a second connected portion 1350b connected to the fixing unit 1100.

Generally, the spring 1350 has a proper frequency and the proper frequency of the spring could cause the time loss which makes the moving unit 1200 wait for a preset time period. Accordingly, the damper 1360 may be arranged between the spring 1350 and the fixing unit 1100 to reduce the proper vibration of the spring. The damper 1360 may be arranged in any regions between the spring 1350 and the fixing unit 1100.

For example, the damper 1360 may be arranged adjacent to the second connected portion 1350a connectedly provided between the spring 1350 and the fixing unit 1100. As the damper is provided between the spring 1350 and the fixing unit 1100, the proper vibration of the spring 1350 can be restrained and hysteresis of the spring can be then reduced. Accordingly, auto focusing errors may be reduced and an auto focusing time can be reduced.

Figure 9:
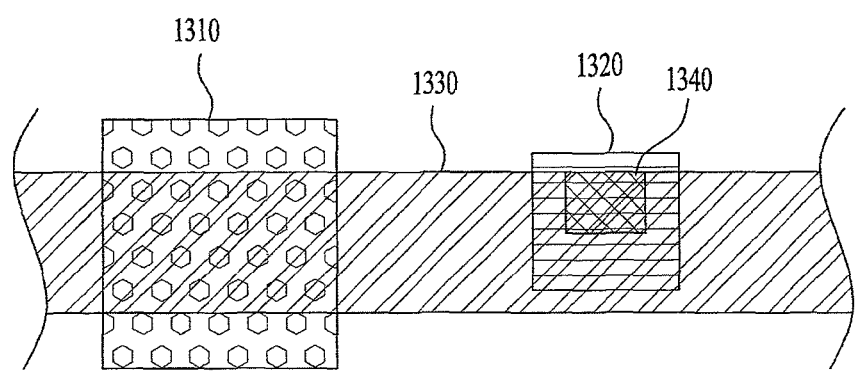
FIG. 9 is a diagram illustrating a relative position with respect to the coil, magnet and flux distortion projection shown in FIG. 1A.

FIG. 9 is a diagram illustrating a relative position with respect to the coil, magnet and flux distortion projection shown in FIG. 1A. FIG. 9 is a view seen toward the fixing unit from the moving unit. In the camera module shown in FIG. 9, the magnet 1310 and the sensor 1320 may be arranged in parallel. The coil 1330 having the flux distortion projection 1340 is arranged, with facing the magnets 1310 and the sensor 1320.

The flux distortion projection 1340 may be arranged to face the sensor 1320. The coil 1330 having the flux distortion projection 1340 may move upward or downward. The moving unit having the lens module can auto-focus an object. The flux flow toward the coil 1330 from the magnets 1310 can be distorted by the flux distortion projection 1340 and the change of the distorted flux may be sensed by the sensor 1320.

Figure 10A:
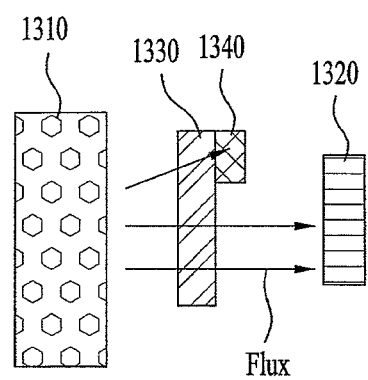
FIGS. 10A through 10C are diagrams illustrating change of flux in accordance with movement of the coil shown in FIG. 1A.
Figure 10B:
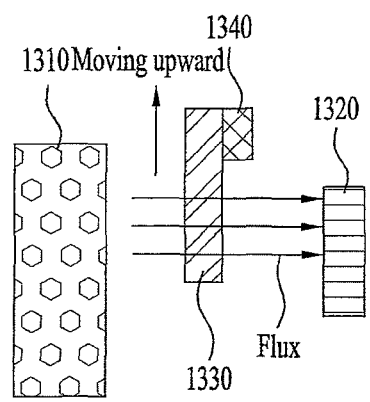
Figure 10C:
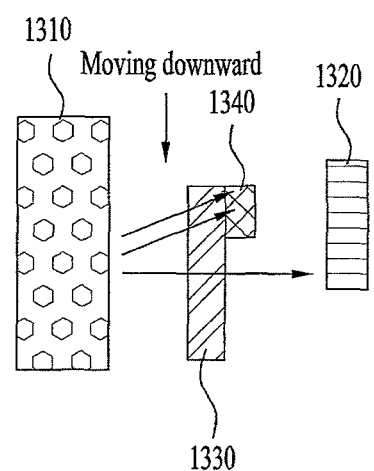

FIGS. 10A through 10C are diagrams illustrating a change of flux in accordance with movement of the coil shown in FIG. 1A. For explanation sake, the coil shown in FIG. 9 is rotated 90 degrees in FIGS. 10A through 10C. When the coil 1330 having the flux distortion projection 1340 in FIG. 10A is positioned in the central portion, some of the flux generated by the magnet 1310 may travel toward the sensor 1320 via the coil 1330 and some of the flux may be distorted by the flux distortion projection 1340, to travel toward the flux distortion projection 1340 instead of toward the sensor 1320.

The amount of the flux traveling toward the sensor 1320 may be larger than the amount of the flux traveling toward the flux distortion projection 1340. The sensor 1320 may sense change of such flux. When the coil 1330 having the flux distortion projection 1340 is moved upward as shown in FIG. 10B, all of the flux generated by the magnet 1310 may travel toward the sensor 1320 via the coil 1330. The amount of flux traveling toward the sensor 1320 may increase greatly, compared with the amount of the flux shown in FIG. 10A. The sensor 1320 may sense change of such the increased flux.

When the coil 1330 having the flux distortion projection 1340 is moved downward as shown in FIG. 10C, some of the flux generated by the magnet 1310 may travel toward the sensor 1320 via the coil 1330 and some of the flux may be distorted by the flux distortion projection 1340 to travel toward the flux distortion projection 1340, instead of the sensor 1320. The amount of the flux traveling toward the sensor 1320 may be smaller than the amount of the flux traveling toward the flux distortion projection 1340 and the sensor 1320 may change the change of such the flux.

Figure 11:
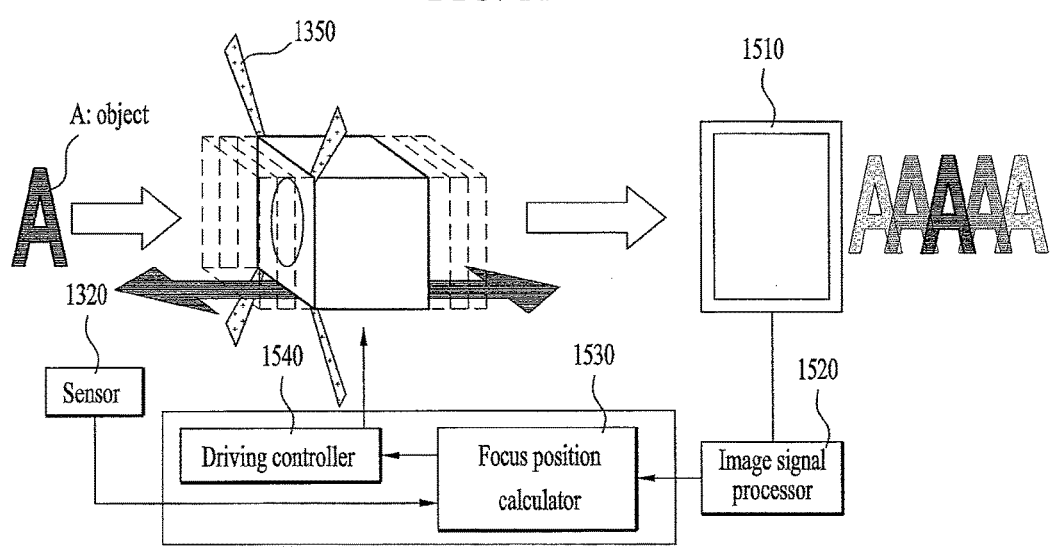
FIG. 11 is a block diagram illustrating an auto focusing control unit of a camera module in accordance with one embodiment of the invention.

Next, FIG. 11 is a block diagram illustrating an auto focusing control unit of a camera module in accordance with one embodiment of the invention. As shown in FIG. 11, the camera module includes the auto focusing control unit for controlling auto focusing of the moving unit which is the lens module. The auto focusing control unit may include an image sensor 1510, an image signal processor 1520, a focus position calculator 1530 and a driving controller 1540.

The image sensor 1510 may sense an image incident through a lens of the moving unit connected to the fixing unit via the spring 1350 to auto-focusing-move. The image signal processor 1520 may process the image signal sensed by the image sensor 1510. The focus position calculator 1530 may receive a variation of flux in accordance with the movement of the moving unit sensed by the sensor 1320 arranged in the fixing unit 110 and calculate an optimal focus position value. The driving controller 1540 may control the driving unit to move the moving unit 1200 to the calculated optimal focus position value.

Figure 12:
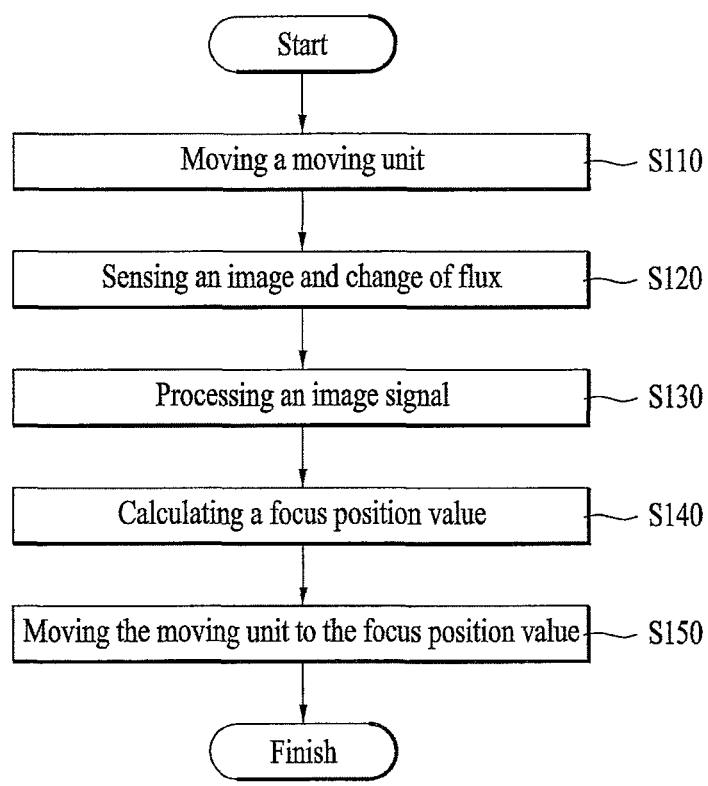
FIG. 12 is a flow chart illustrating a method for auto focusing of a camera module in accordance with one embodiment of the invention.

FIG. 12 is a flow chart illustrating a method for auto focusing of a camera module in accordance with one embodiment of the invention. As shown in FIG. 12, the driving controller moves the moving unit for auto focus (S110). Next, the image sensor senses the image incident through the lens of the moving unit and the sensor arranged in the fixing unit senses change of the flux generated by the movement of the moving unit (S120).

The image signal processor processes the image signal sensed by the image sensor (S130). The focus position calculator calculates an optimal focus position value based on the image signal processed by the image signal processor and the variation value of the flux generated by the movement of the moving unit (S140). Hence, the driving controller moves the moving unit to the calculated optimal focus position value to auto-focus-move the moving unit (S150).

In one embodiment of the present invention, the sensor is attached to the fixing unit and the flux distortion projection is arranged in the moving unit. Accordingly, the auto focus position can be found rapidly and precisely. In one embodiment of the present invention, the damper is provided between the spring and the fixing unit and the proper vibration of the spring is reduced. Accordingly, auto-focus errors may be prevented and the auto-focus time may be reduced.

Figure 13:
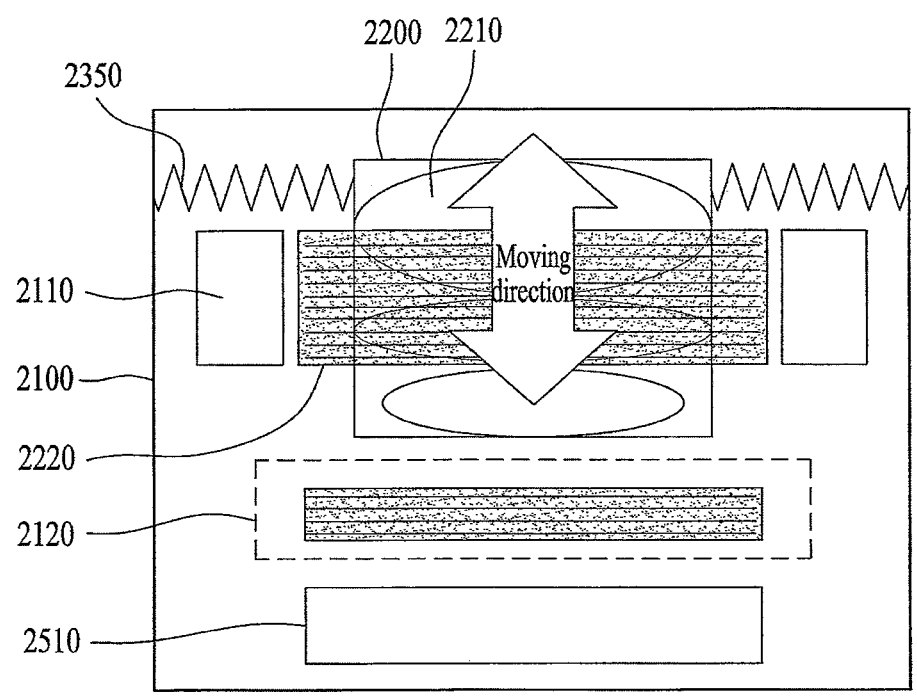
FIG. 13 is a diagram illustrating a structure of a camera module in accordance with another embodiment of the invention.

FIG. 13 is a diagram illustrating a structure of a camera module in accordance with another embodiment of the invention. The camera module in this embodiment shown in FIG. 13 may include a fixing unit 2100 having a magnet 2110 and a fixed coil 2120, and a moving unit 2200 having a lens 2210 and a moving coil 2220.

A hole may be formed in a central portion of the fixing unit 2100. In addition, the magnet 2110 may be arranged in an inner surface of the hole formed in the fixing unit 2100. For example, a single magnet 2110 may be provided or a plurality of magnets 2110 may be provided as the case may be.

In the latter case, the plurality of the magnets 2110 may be arranged at uniform intervals or at different intervals as the case may be. The plurality of the magnets 2110 may be arranged in symmetry with respect to a coordinate axis passing a center of the hole formed in the fixing unit 2110. The reason why the plurality of the magnets 2110 are arranged in symmetry with respect to the coordinate axis passing the center of the hole formed in the fixing unit 2110 is that a displacement value of currents or voltages generated by the movement of the moving unit 1200 which is the lens module can be detected stably, without external influence.

The moving unit 2200 may include at least one lens 2210 and linearly move within the hole of the fixing unit 2100. The moving unit 2200 may be a lens module including lenses 2210. The moving coil 2220 may be arranged to surround an outer surface of the moving unit 2200 and move together with the moving unit 2200. As an actuator for moving the moving unit 2200, the moving coil 2220 and the magnet 2110 may linearly move the moving unit 2200 upward or downward.

The fixed coil 2120 may be arranged in the fixing unit 2100 and receive currents or voltages variable based on a distance with the moving coil 2220. The fixed coil 2120 may be spaced apart a preset distance from a portion of the moving unit 2100 and positioned on a line in a moving direction of the moving unit 2100. Accordingly, currents or voltages may be induced toward the fixed coil 2120 from the moving coil 2220 by electromagnetic mutual induction.

In addition, an induced current or voltage value may be variable based on a distance between the fixed coil 2120 and the moving coil 2220. In other words, a current or voltage value induced to the fixed coil 2120 may be variable based on a vertical distance between the fixed coil 2120 and the moving coil 2220. A position value of the lens module of the moving unit 2200 may be expected, using the displacement value.

Using the expected position value of the lens module, an optimal auto-focus position value may be found and the movement of the moving unit 2200 may be controlled to move an actual position value of the lens module to an optimal auto focus position value. The number of the fixed coil windings may be different from the number of the moving coil windings. For example, the number of the fixed coil 2210 windings may be smaller than the number of the moving coil 2220 windings.

The reason why the fixed coil windings are smaller than the moving coil windings is that the overall size of the camera module can be reduced and that a frequency signal for the current or voltage induced to the fixed coil 2120 can be amplified. Further, the number of the fixed coil 2120 windings may be equal to the number of the moving coil 2220 windings.

The moving coil 2220 may transmit a driving signal having a low frequency signal with high frequency signal applied thereto to the fixed coil 2120. In other words, the driving signal applied to the moving coil 2220 of the moving unit 2200 may be a low driving signal with a random high frequency signal. Here, the low frequency signal of the driving signal may be a signal component for driving auto focus of the lens, and the high frequency signal of the driving signal may be a signal component for sensing position of the lens. That is, the low frequency signal may be a lens driving signal for the auto focus. Accordingly, the fixed coil 2120 may receive a frequency signal for a current or voltage induced from the moving coil 2220 via electromagnetic induction. The received frequency signal may be a low frequency signal with a high frequency signal.

The reason why the driving signal having a high frequency signal in a low frequency signal is applied to the moving coil 2220 is that a displacement value of the current or voltage can be detected easily by amplifying the frequency signal for the current or voltage induced to the fixed coil 2120 via the electromagnetic induction. The camera module in accordance with the present invention may include a spring 2350 connected between the fixed unit 2100 and the moving unit 2200 to provide an electric force in accordance with the movement of the moving unit 2200.

A damper may be arranged between the spring 2350 and the fixing unit 2100. The damper may be arranged adjacent to a connection spot between the spring 2350 and the fixing unit 2100. In addition, the reason why the damper is provided is that proper vibration of the spring 2350 can be reduced. An error of auto focus can be prevented by reducing hysteresis.

The camera module in accordance with the present invention may include a detection unit for detecting a displacement value of a current or voltage received from the fixed coil 2120. The detection unit may include a half-wave rectifier for rectifying a frequency signal for the current or voltage received from the fixed coil into a half-wave signal, a converter for converting the half-wave signal received from the half-wave rectifier into a current or voltage, an amplifier for amplifying a frequency signal for the current or voltage converted by the converter, and a peak detector for detecting a peak of the frequency signal amplified by the amplifier.

The camera module in accordance with the present invention may further include an auto focusing control unit for controlling auto focusing of the moving unit 2200 which is the lens module. The auto focusing control unit may include an image sensor 2510, an image signal processor, a focus position calculator and a driving controller.

The image sensor 2510 may sense an image incident through a lens 2210 of the moving unit 2200. The image signal processor may process the image signal sensed by the image sensor 2510. The focus position calculator may calculate an optimal focus position value based on the image signal processed by the image signal processor and a displacement value of the current or voltage received from the fixed coil arranged in the fixing unit.

The driving controller may control the driving unit to move the moving unit 2200 to the calculated optimal focus position value. The camera module in accordance with this embodiment of the present invention may have the fixed coil arranged in the fixing unit and the moving coil arranged in the moving unit 2200, and the displacement value of the current or voltage in accordance with the distance between the fixed coil and the moving coil, such that the auto focus position can be found rapidly and precisely. In this embodiment of the present invention, the damper is arranged between the spring 2350 and the fixing unit 2100 and the proper vibration of the spring 2350 is reduced. Accordingly, errors of the auto focus may be prevented.

Figure 14:
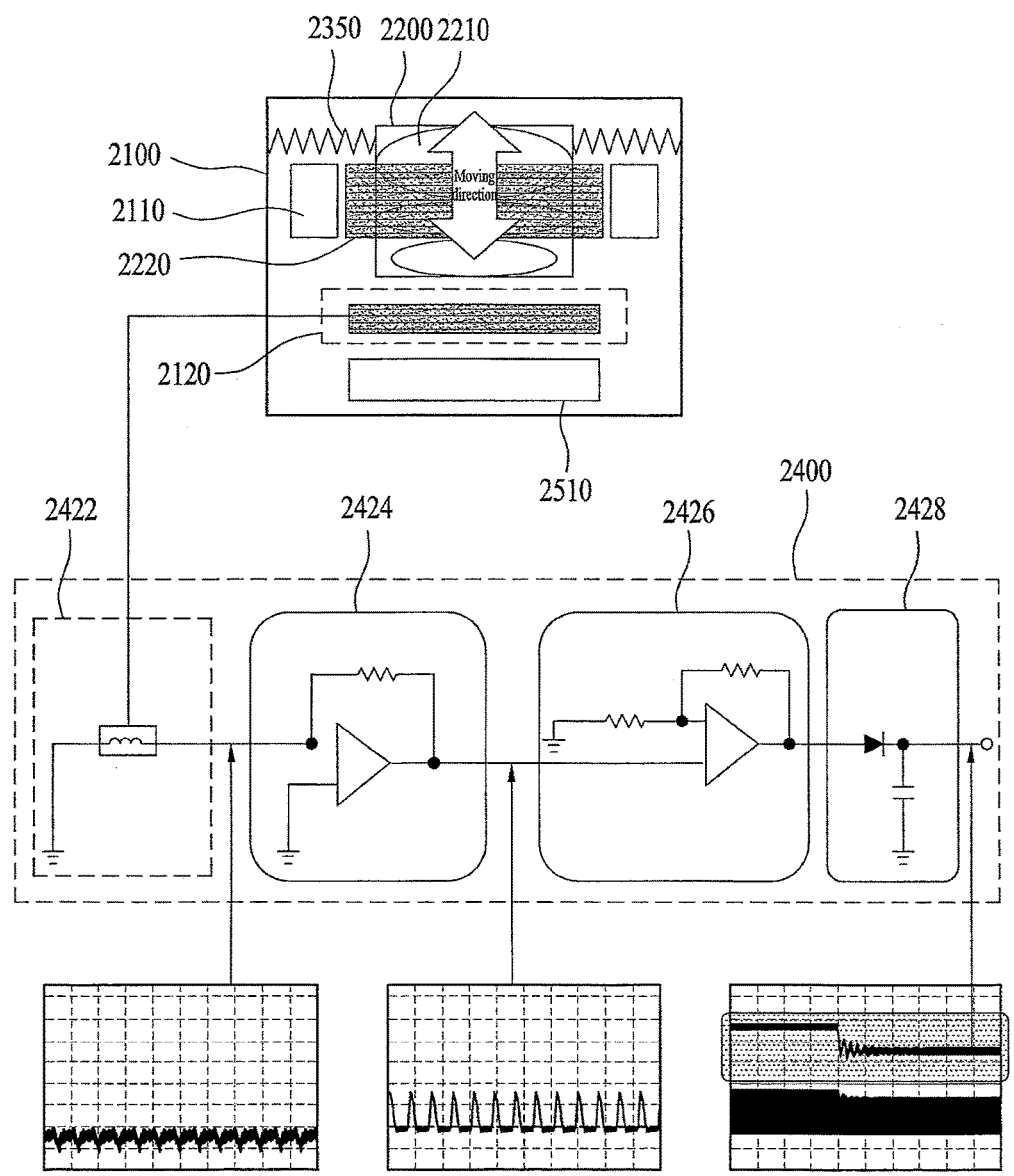
FIG. 14 is a diagram of a circuit illustrating a detection unit of the camera module in accordance with the embodiment of the invention shown in FIG. 13.

FIG. 14 is a diagram of a circuit illustrating a detection unit of the camera module in accordance with the embodiment of the invention shown in FIG. 13. In the camera module shown in FIG. 14, a permanent magnet 2110 is arranged in the fixing unit 2100 and the moving coil 2220 is arranged in the moving unit 2200, only to configurator a magnetic circuit. The moving unit 2200 which is the lens module is driven by Lorentz's force traveling through the coil of the magnetic circuit.

The fixed coil 2120 may be arranged in the fixing unit 2100 and receive a current or voltage variable based on the distance with the moving coil 2220 from the moving coil 2200. The fixed coil 2120 may be spaced apart a preset distance from a portion of the moving unit 2100 and it may be located on a line in a moving direction of the moving unit 2100. Accordingly, the current or voltage may be induced toward the fixed coil 2120 from the moving coil 2220 by electromagnetic induction.

The induced current or voltage may be variable based on a distance between the fixed coil 2120 and the moving coil 2220. In other words, the current or voltage value induced to the fixed coil 2120 may be varied based on a vertical distance between the fixed coil 2120 and the moving coil 2220. A location value of the lens module of the moving unit 2200 may be expected, using such the displacement value.

The detection unit 2400 may detect a displacement value of the current or voltage received from the fixed coil 2120. The detection unit 2400 may include a half-wave rectifier 2422, a converter 2424, an amplifier 2426 and a peak detector 2428, and this embodiment is not limited thereto. The half-wave rectifier 2422 of the detection unit 2400 may rectify a frequency signal for the current or voltage received from the fixed coil 2120 into a half-wave signal.

The converter 2424 of the detection unit 2400 may convert the half-wave signal received from the half-wave rectifier 2422 into a current or voltage. The amplifier 2426 of the detection unit 2400 may amplify a frequency signal for the current or voltage converted by the converter 2424. The peak detector 2428 may detect a peak of the frequency signal amplified by the amplifier 2426. For example, the half-wave rectifier 2422 rectifies a frequency signal for the induced current into a half-wave signal, when a current is induced to the fixed coil 2120.

The converter 2424 converts the half-wave signal rectified by the half-wave rectifier into a voltage, as a current-voltage converter circuit for converting a current into a voltage. The amplifier 2426 amplifies the converted voltage. The peak detector 2428 detects a peak value of the amplified voltage and outputs the detected peak value. The detector 2400 may detect a displacement value of the current or voltage received from the fixed coil 2120 and the auto focusing control unit for controlling the auto focusing of the moving unit 2200 which is the lens module may expect a position value of the lens module of the moving unit 2200. The auto focusing control unit may find an optimal auto focus position value, using the expected position value of the lens module, and control the moving unit 2200 to move an actual position value of the lens module to the optimal auto focus position value.

Figure 15:
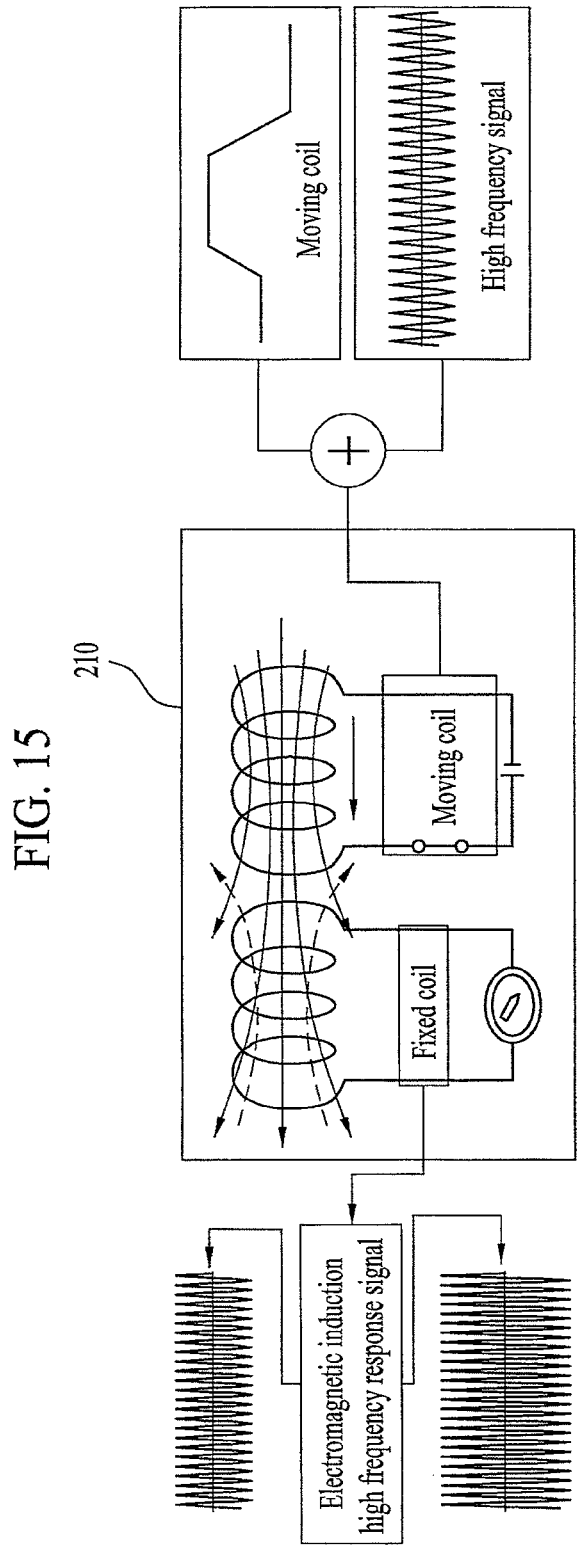
FIG. 15 is a diagram illustrating electromagnetic induction between a fixing coil and a moving coil shown in FIG. 13.

FIG. 15 is a diagram illustrating electromagnetic induction between a fixing coil and a moving coil shown in FIG. 13. As shown in FIG. 15, a driving signal having a high frequency signal in a low frequency signal is applied to the moving coil of the camera module 210 and the camera module 210 may transmit the driving signal to the fixed coil.

The driving signal applied to the moving coil of the moving unit may be a signal having a random high frequency signal in a low frequency driving signal. Accordingly, the fixed coil may receive a frequency signal for the current or voltage induced from the moving coil and the received frequency signal may be a signal having a high frequency signal in a low frequency signal.

An electromagnetic induction high frequency response signal received in the fixed coil may be getting lessened as the distance between the fixed coil and the moving coil is farther and increased as the distance is reduced. The electromagnetic induction high frequency response signal received to the fixed coil is varied based on the distance between the fixed coil and the moving coil. Accordingly, the detection unit can detect the displacement value of the current or voltage received by the fixed coil.

The auto focusing control unit may expect a position value of the lens module of the moving unit 2200, using the detected displacement value. The auto focusing control unit may find out an optimal auto focus position value, using the expected value of the lens module, and control the movement of the moving unit to move an actual position value of the lens module to an optimal auto focus position value.

Figure 16:
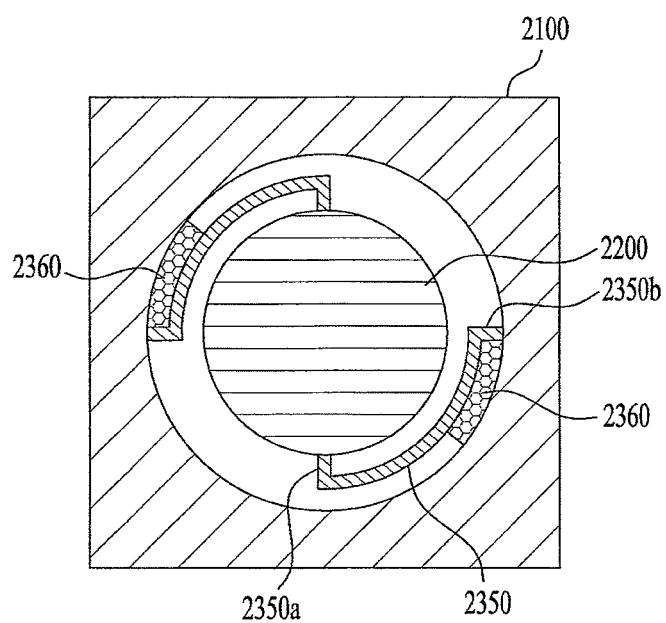
FIG. 16 is a plane view illustrating a spring shown in FIG. 13.

FIG. 16 is a plane view illustrating the spring of FIG. 13. The spring 2350 shown in FIG. 16 may be connected between the fixed unit 2100 and the moving unit 2200 and provide an elastic force in accordance with the movement of the moving unit 2200. The spring 2350 may include a first connected portion 2350*a* connected to the moving unit 2200 and a second connected portion 2350*b* connected to the fixing unit 2100.

Generally, the spring 2350 has a proper frequency and the proper frequency of the spring could cause the time loss which makes the moving unit 2200 wait for a preset time period. Accordingly, the damper 2360 may be arranged between the spring 2350 and the fixing unit 2100 to reduce the proper vibration of the spring 2350. The damper 2360 may be arranged in any regions between the spring 2350 and the fixing unit 2100.

For example, the damper 2360 may be arranged adjacent to the second connected portion 2350*a* connectedly provided between the spring 1350 and the fixing unit 2100. As the damper is provided between the spring 2350 and the fixing unit 2100, the proper vibration of the spring 2350 can be restrained and hysteresis of the spring can be then reduced. Accordingly, auto focusing errors may be reduced and an auto focusing time can be reduced.

Figure 17:
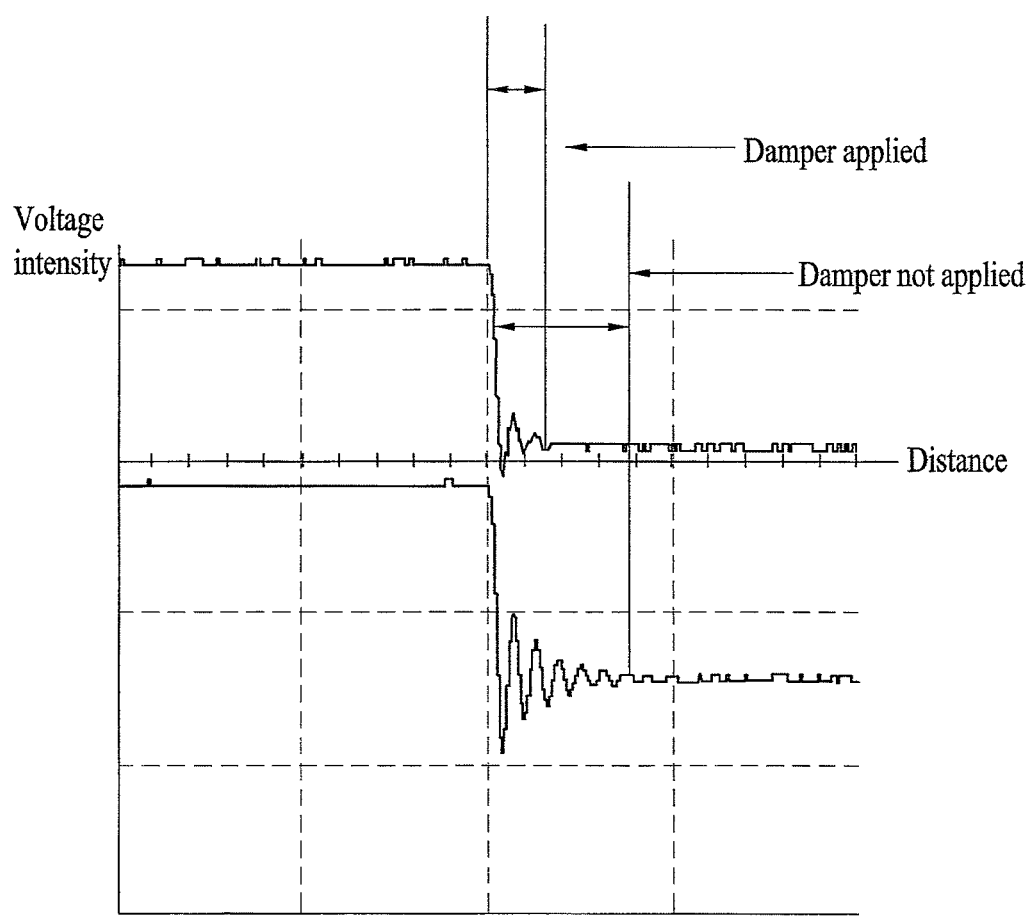
FIG. 17 is a graph showing characteristics of natural frequency before and after the spring is applied to a damper.

FIG. 17 is a graph showing characteristics of natural frequency before and after the spring is applied to a damper. As shown in FIG. 17, it takes a long time to stabilize the moving unit after the movement when the damper is not applied to the spring. Accordingly, unnecessary time loss might occur.

However, when the damper is applied to the spring, the moving unit after the movement can be stabilized in a quite short time. The unnecessary time loss taken to wait until the moving unit is stabilized. As the damper is applied to the spring, the proper vibration of the spring can be restrained and hysteresis of the spring can be then reduced. Accordingly, auto focusing errors may be reduced and an auto focusing time can be reduced.

Figure 18:
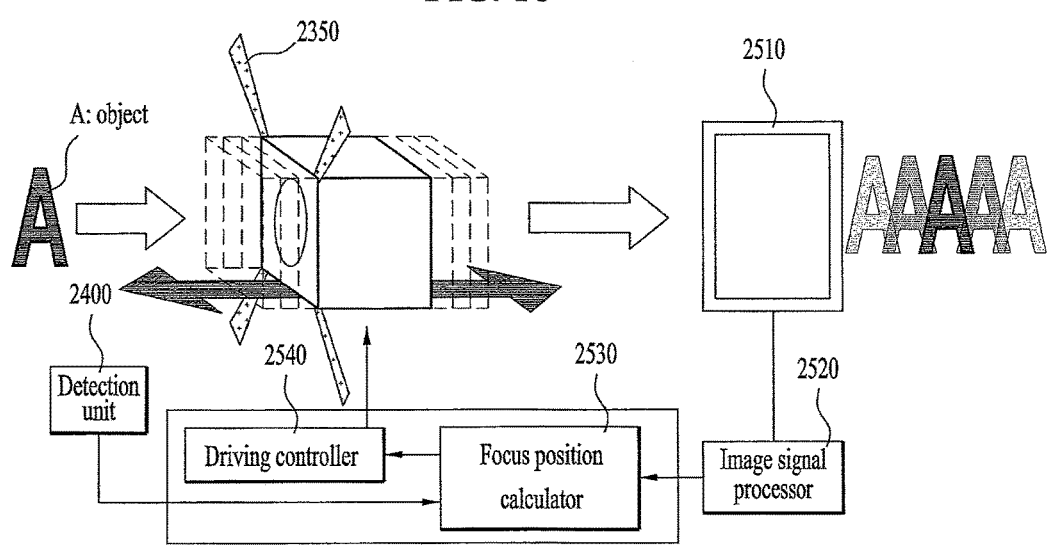
FIG. 18 is a block diagram illustrating an auto focusing control unit of the camera module in accordance with the embodiment of the invention shown in FIG. 13.

FIG. 18 is a block diagram illustrating an auto focusing control unit of the camera module in accordance with the embodiment of the invention shown in FIG. 13. The camera module in accordance with the present invention shown in FIG. 18 may further include an auto focusing control unit for controlling auto focusing of the moving unit 2200 which is the lens module. The auto focusing control unit may include an image sensor 2510, an image signal processor 2520, a focus position calculator 2530 and a driving controller 2540.

The image sensor 2510 may sense an image incident through a lens 2210 of the moving unit 2200. The image signal processor 2520 may process the image signal sensed by the image sensor 2510. The focus position calculator 2530 may calculate an optimal focus position value based on the image signal processed by the image signal processor 2520 and a displacement value of the current or voltage in accordance with the distance between the moving coil and the fixed coil detected by the detection unit 2400. The driving controller 2540 may control the driving unit to move the moving unit 2200 to the calculated optimal focus position value.

FIGS. 19 and 20 are flow charts illustrating an auto focusing method of a camera module in accordance with the embodiment shown in FIG. 13. As shown in FIGS. 19 and 20, the driving controller moves the moving unit for auto focus (S210). The driving signal is applied to the moving coil. The driving signal may be a driving signal having a high frequency signal in a low frequency signal. The image sensor senses the image incident through the lens of the moving unit. The detection unit detects a displacement value of a current or voltage in accordance with a distance between the moving coil and the fixed coil (S220).

In the step of detecting the displacement value of the current or voltage in accordance with the distance between the moving coil and the fixed coil, the half-wave rectifier of the detection unit rectifies a frequency signal for the current or voltage received from the fixed coil into a half-wave signal (S222). The converter of the detection unit converts the rectified half-wave signal into a current or voltage (S224). The amplifier of the detection unit amplifies a frequency signal for the converted current or voltage (S226).

The peak detector of the detection unit detects and outputs a peak of the amplified frequency signal, to detect a displacement value of the current or voltage (S228). Hence, the image signal processor processes the image signal sensed by the image sensor (S230). The focus position calculator calculates an optimal focus position value based on the image signal processed by the image signal processed and the displacement value of the current or voltage in accordance with the distance between the moving coil and the fixed coil detected by the detection unit (S240).

The driving controller moves the moving unit to the calculated optimal focus position value, for auto focusing (S250). The camera module in accordance with this embodiment of the present invention may have the fixed coil arranged in the fixing unit and the moving coil arranged in the moving unit. Also, the camera module may detect the displacement value of the current or voltage in accordance with the distance between the fixed coil and the moving coil, only to find out the auto focus position rapidly and precisely.

In addition, the camera module in accordance with this embodiment of the present invention may have the damper arranged between the spring and the fixing unit, only to reduce the proper vibration of the spring. Accordingly, errors of the auto focus may be prevented and the auto focus time may be reduced.

Although embodiments have been described with reference to a number of illustrative embodiments thereof, numerous other modifications and embodiments can be devised by those skilled in the art that will fall within the spirit and scope of the principles of this invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A camera module comprising:
   a fixing unit having a hole formed therein;
   a magnet placed inside the fixing unit;
   a moving unit including at least one lens, and configured to move in the hole of the fixing unit;
   a moving coil on a surface of the moving unit;
   a fixed coil configured to generate a current or voltage by electromagnetic induction between the moving coil and the fixed coil, the current or voltage being varied according to a distance between the moving coil and the fixed coil, wherein the moving unit is moved based on a force between the moving coil and the magnet; and
   a controller configured to determine a position of the moving unit for an autofocus of the camera module based on the current or voltage generated by the electromagnetic induction.

2. The camera module of claim 1, wherein the moving coil surrounds an outer surface of the moving unit.

3. The camera module of claim 1, wherein the fixed coil is arranged on a surface of the fixing unit.

4. The camera module of claim 1, wherein a number of coil windings of the fixed coil is less than a number of coil windings of the moving coil.

5. The camera module of claim 1, further comprising:
   a driving unit configured to apply a driving signal having a low frequency component and a high frequency component to the moving coil,
   wherein the low frequency component is to move the moving unit and the high frequency component is to determine the position of the moving unit for the autofocus.

6. The camera module of claim 1, further comprising:
   a detection unit configured to detect the current or voltage received from the fixed coil.

7. The camera module of claim 6, wherein the detection unit comprises:
   a half-wave rectifier configured to rectify a frequency signal for the current or voltage received from the fixed coil into a half-wave signal;
   a converter configured to convert the half-wave signal received from the half-wave rectifier into a current or voltage;
   an amplifier configured to amplify a frequency signal for the current or voltage converted by the converter; and
   a peak detector configured to detect a peak of the frequency signal amplified by the amplifier.

8. The camera module of claim 5, further comprising:
an image sensor configured to sense an image incident through the at least one lens of the moving unit; and
an image signal processor configured to process the image sensed by the image sensor,
wherein the controller is configured to:
calculate an optimal focus position value based on the image processed by the image signal processor and the current or voltage received from the fixed coil, and
control the driving unit to apply the driving signal to move the moving unit according to the calculated optimal focus position value.

9. A mobile terminal capable of controlling an autofocus, the mobile terminal comprising:
a magnet;
a moving unit including at least one lens and configured to move;
a moving coil on a surface of the moving unit;
a fixed coil; and
a controller configured to:
provide a first current or voltage signal to the moving coil, wherein a second current or voltage signal is induced to the fixed coil by electromagnetic induction between the moving coil and the fixed coil, and
determine a position of the moving unit for the autofocus based on the induced second current or voltage signal,
wherein the induced second current or voltage signal is varied according to a distance between the moving coil and the fixed coil,
wherein the first current or voltage signal comprises a low frequency component and a high frequency component, and
wherein the low frequency component is to move the moving unit and the high frequency component is to determine the position of the moving unit for the autofocus.

10. The mobile terminal of claim 9, wherein the moving coil surrounds an outer surface of the moving unit.

11. The mobile terminal of claim 9, further comprising:
a fixing unit, wherein the fixed coil is arranged on a surface of the fixing unit.

12. The mobile terminal of claim 9, wherein a number of coil windings of the fixed coil is less than a number of coil windings of the moving coil.

13. The mobile terminal of claim 9, further comprising:
a driving unit configured to provide the first current or voltage signal to the moving coil.

14. The mobile terminal of claim 9, further comprising:
a detection unit configured to detect the second current or voltage signal received from the fixed coil.

15. The mobile terminal of claim 14, wherein the detection unit comprises:
a half-wave rectifier configured to rectify a frequency signal for the second current or voltage signal received from the fixed coil into a half-wave signal;
a converter configured to convert the half-wave signal received from the half-wave rectifier into a third current or voltage signal;
an amplifier configured to amplify a frequency signal for the third current or voltage signal converted by the converter; and
a peak detector configured to detect a peak of the frequency signal amplified by the amplifier.

16. The mobile terminal of claim 13, further comprising:
an image sensor configured to sense an image incident through the at least one lens of the moving unit;
an image signal processor configured to process the image sensed by the image sensor;
a focus position calculator configured to calculate an optimal focus position value based on the image processed by the image signal processor and the second current or voltage signal received from the fixed coil; and
a driving controller configured to control the driving unit to provide the first current or voltage signal to move the moving unit according to the calculated optimal focus position value.

17. A mobile terminal capable of controlling an autofocus, the mobile terminal comprising:
a moving unit including at least one lens and configured to move;
a moving coil on a surface of the moving unit;
a fixed coil;
an image sensing unit configured to sense an image incident through the at least one lens of the moving unit;
an image processing unit configured to process the image sensed by the image sensing unit; and
a controller configured to:
provide a first current or voltage signal to the moving coil, wherein a second current or voltage signal is induced to the fixed coil by electromagnetic induction between the moving coil and the fixed coil, and
determine a position of the moving unit for the autofocus based on the induced second current or voltage signal and the image processed by the image processing unit,
wherein the induced second current or voltage signal is varied according to a distance between the moving coil and the fixed coil,
wherein the first current or voltage signal comprises a lower frequency component and a high frequency component, and
wherein the low frequency component is to move the moving unit and the high frequency component is to determine the position of the moving unit for the autofocus.

18. The mobile terminal of claim 17, wherein the moving coil surrounds an outer surface of the moving unit.

19. The mobile terminal of claim 17, further comprising:
a fixing unit, wherein the fixed coil is arranged on a surface of the fixing unit.

20. The mobile terminal of claim 17, further comprising:
a fixing unit, wherein a number of coil windings of the fixed coil is less than a number of coil windings of the moving coil.

21. The mobile terminal of claim 17, further comprising:
a driving unit configured to provide the first current or voltage signal to the moving coil.

22. The mobile terminal of claim 17, further comprising:
a detection unit configured to detect the second current or voltage signal received from the fixed coil.

23. The mobile terminal of claim 22, wherein the detection unit comprises:
a half-wave rectifier configured to rectify a frequency signal for the second current or voltage signal received from the fixed coil into a half-wave signal;
a converter configured to convert the half-wave signal received from the half-wave rectifier into a third current or voltage signal;
an amplifier configured to amplify a frequency signal for the third current or voltage signal converted by the converter; and a peak detector configured to detect a peak of the frequency signal amplified by the amplifier.

24. The mobile terminal of claim 21, further comprising:
a focus position calculator configured to calculate an optimal focus position value based on the image processed by the image processing unit and the second current or voltage signal received from the fixed coil; and
a driving controller configured to control the driving unit to provide the first current or voltage signal to move the moving unit according to the calculated optimal focus position value.

25. The mobile terminal of claim 16, wherein the controller includes the focus position calculator and the driving controller.

26. The mobile terminal of claim 24, wherein the controller includes the focus position calculator and the driving controller.

27. A camera module comprising:
a fixing unit;
a magnet;
a moving unit including at least one lens, and configured to move;
a moving coil on a surface of the moving unit;
a fixed coil configured to generate a current or voltage by electromagnetic induction between the moving coil and the fixed coil, the current or voltage being varied according to a distance between the moving coil and the fixed coil, wherein the moving unit is moved based on a force between the moving coil and the magnet; and
a controller configured to identify the current or voltage generated by the electromagnetic induction to determine a position of the moving unit for an autofocus of the camera module.

\* \* \* \* \*